(12) United States Patent
Takai et al.

(10) Patent No.: US 11,656,621 B2
(45) Date of Patent: May 23, 2023

(54) CONVEYANCE CONTROL SYSTEM, NON-TRANSITORY COMPUTER READABLE MEDIUM STORING CONVEYANCE CONTROL PROGRAM, AND CONVEYANCE CONTROL METHOD

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Mikio Honda, Toyota (JP); Shiro Oda, Anjyo (JP); Tetsuya Taira, Nagakute (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 17/096,171

(22) Filed: Nov. 12, 2020

(65) Prior Publication Data

US 2021/0157317 A1    May 27, 2021

(30) Foreign Application Priority Data

Nov. 25, 2019    (JP) .............................. JP2019-212518

(51) Int. Cl.
*G05D 1/00* (2006.01)
*G05D 1/02* (2020.01)
(Continued)

(52) U.S. Cl.
CPC ......... *G05D 1/0088* (2013.01); *G01C 21/206* (2013.01); *G05B 19/4155* (2013.01);
(Continued)

(58) Field of Classification Search
CPC .. G05D 1/0088; G05D 1/0011; G05D 1/0212; G05D 1/0231; G05D 1/0255;
(Continued)

(56) References Cited

U.S. PATENT DOCUMENTS 11,164,273 B2 * 11/2021 Heinla ............... G06Q 10/0832
2007/0112461 A1   5/2007 Zini et al.
(Continued)

FOREIGN PATENT DOCUMENTS

JP        2001-287183 A    10/2001
WO    2017/216854 A1    12/2017

*Primary Examiner* — Jeff A Burke
*Assistant Examiner* — Blake A Wood
(74) *Attorney, Agent, or Firm* — Oliff PLC

(57) ABSTRACT

The present disclosure provides a conveyance control system and the like that enable a scheduled recipient of a conveyance object to reliably receive the conveyance object even when a destination of a conveyance robot is changed for any reason. The conveyance control system is a conveyance control system configured to control a conveyance robot to autonomously move and convey a conveyance object to a destination, including: a change unit configured to change the destination after the conveyance robot starts conveying the conveyance object; and a notification unit configured to notify an information terminal of a scheduled recipient of the conveyance object about destination information regarding the destination that has been changed by the change unit.

10 Claims, 12 Drawing Sheets

(51) Int. Cl.
  *G01C 21/20* (2006.01)
  *G05B 19/4155* (2006.01)
(52) U.S. Cl.
  CPC ......... G05D 1/0011 (2013.01); G05D 1/0212 (2013.01); *G05B 2219/50391* (2013.01); *G05D 1/0231* (2013.01); *G05D 1/0255* (2013.01); *G05D 2201/0211* (2013.01)
(58) Field of Classification Search
  CPC ... G05D 2201/0211; G05D 2210/0216; G01C 21/206; G05B 19/4155; G05B 2219/50391; G06Q 10/08; G06Q 50/28
  See application file for complete search history.

(56) References Cited

U.S. PATENT DOCUMENTS

| | | | |
|---|---|---|---|
| 2017/0364074 A1* | 12/2017 | Lau | G06Q 50/28 |
| 2018/0321687 A1* | 11/2018 | Chambers | H04W 24/08 |
| 2019/0147751 A1 | 5/2019 | Sasao | |
| 2019/0172284 A1* | 6/2019 | Herget | B25J 5/007 |

* cited by examiner

CONVEYANCE CONTROL SYSTEM, NON-TRANSITORY COMPUTER READABLE MEDIUM STORING CONVEYANCE CONTROL PROGRAM, AND CONVEYANCE CONTROL METHOD

CROSS REFERENCE TO RELATED APPLICATIONS

This application is based upon and claims the benefit of priority from Japanese patent application No. 2019-212518, filed on Nov. 25, 2019, the disclosure of which is incorporated herein in its entirety by reference.

BACKGROUND

The present disclosure relates to a conveyance control system, a non-transitory computer readable medium storing a conveyance control program, and a conveyance control method.

A conveyance robot that automatically conveys a conveyance object (i.e., an object to be conveyed) to a destination is known. For example, when a shipping worker specifies, at the starting point, a scheduled recipient (i.e., a person who is scheduled to receive a conveyance object) or a destination, a system server notifies an information terminal or the like of the specified scheduled recipient about the destination as a place where he/she receives the conveyance object. When a conveyance robot reaches the destination, the scheduled recipient can take out the conveyance object from the conveyance robot (see, for example, Japanese Unexamined Patent Application Publication No. 2001-27183 and United States Patent Publication No. 2007/112461).

SUMMARY

A conveyance robot does not always reach a set destination. If the destination of the conveyance robot is changed for any reason, a scheduled recipient of a conveyance object will become confused about where he/she should receive the conveyance object.

The present disclosure has been made to solve the above-described problem, and it provides a conveyance control system and the like that enable a scheduled recipient of a conveyance object to reliably receive the conveyance object even when a destination of a conveyance robot is changed for any reason.

A first exemplary aspect is a conveyance control system configured to control a conveyance robot to autonomously move and convey a conveyance object to a destination, the conveyance control system including: a change unit configured to change the destination after the conveyance robot starts conveying the conveyance object; and a notification unit configured to notify an information terminal of a scheduled recipient of the conveyance object about destination information regarding the destination that has been changed by the change unit. By configuring the conveyance control system in this way, the scheduled recipient can reliably receive the conveyance object by confirming his/her own information terminal even if the destination of the conveyance robot is changed.

In the aforementioned conveyance control system, when the change unit changes the destination without an instruction from the scheduled recipient, the notification unit notifies the information terminal about the destination information. When the scheduled recipient himself/herself has instructed the conveyance robot to change the destination, the above notification is omitted as he/she already knows where to go to receive the conveyance object.

The aforementioned conveyance control system may further include an acquisition unit configured to acquire location information about a location of the scheduled recipient, in which the change unit may change the destination based on the location information. By this configuration, the scheduled recipient does not need to stay at the original destination until the conveyance robot arrives. For example, the scheduled recipient can receive the conveyance object at a place close to a place to which he/she has moved.

Further, in the aforementioned conveyance control system, when no destination that meets a predetermined criterion is newly found, the change unit may change the destination based on an instruction from a sender or the scheduled recipient of the conveyance object. By having the scheduled recipient change the destination, the conveyance robot can reliably reset the destination. Further, when the conveyance robot has been removed to a place by an external force, the change unit may determine the place to which the conveyance robot has been removed to be a changed destination. For example, if the conveyance robot continues to move despite having been forcibly removed by a third party, the conveyance robot is highly likely to become a further obstacle to the third party. Therefore, when the conveyance robot has been removed to a place by an external force, it is desirable to determine the place to which the conveyance robot has been removed to be a destination and cause the conveyance robot to stay there.

Further, in the aforementioned conveyance control system, the notification unit may also notify a reason why the change unit has changed the destination. The scheduled recipient can determine, for example, whether the conveyance object should be collected in a hurry in accordance with the reason. Further, when the conveyance robot reaches the changed destination and the conveyance object is collected, the notification unit may notify the information terminal of the sender of the conveyance object about collector information regarding a collector. If the sender can confirm the collector information, he/she can confirm that the conveyance object has been safely collected even in an irregular situation in which a destination is changed.

A second exemplary aspect is a conveyance control program for controlling a conveyance robot to autonomously move and convey a conveyance object to a destination, the conveyance control program being stored in a non-transitory computer readable medium and causing a computer to: change the destination after the conveyance robot starts conveying the conveyance object; and notify an information terminal of a scheduled recipient of the conveyance object about destination information regarding the changed destination.

Further, a third exemplary aspect is a conveyance control method for controlling a conveyance robot to autonomously move and convey a conveyance object to a destination, the conveyance control method including: changing the destination after the conveyance robot starts conveying the conveyance object; and notifying an information terminal of a scheduled recipient of the conveyance object about destination information regarding the changed destination. In the aforementioned second and third aspects, even when the destination of the conveyance robot is changed, the scheduled recipient can also reliably receive the conveyance object by confirming the changed destination with the information terminal owned by himself/herself.

According to the present disclosure, it is possible to provide a conveyance control system and the like that enable a scheduled recipient of a conveyance object to reliably receive the conveyance object even when the destination of a conveyance robot is changed for any reason.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the present disclosure, the present disclosure according to claims is not limited to the following embodiments. Further, all the components described in the following embodiments are not necessarily essential as means for solving problems.

Figure 1:
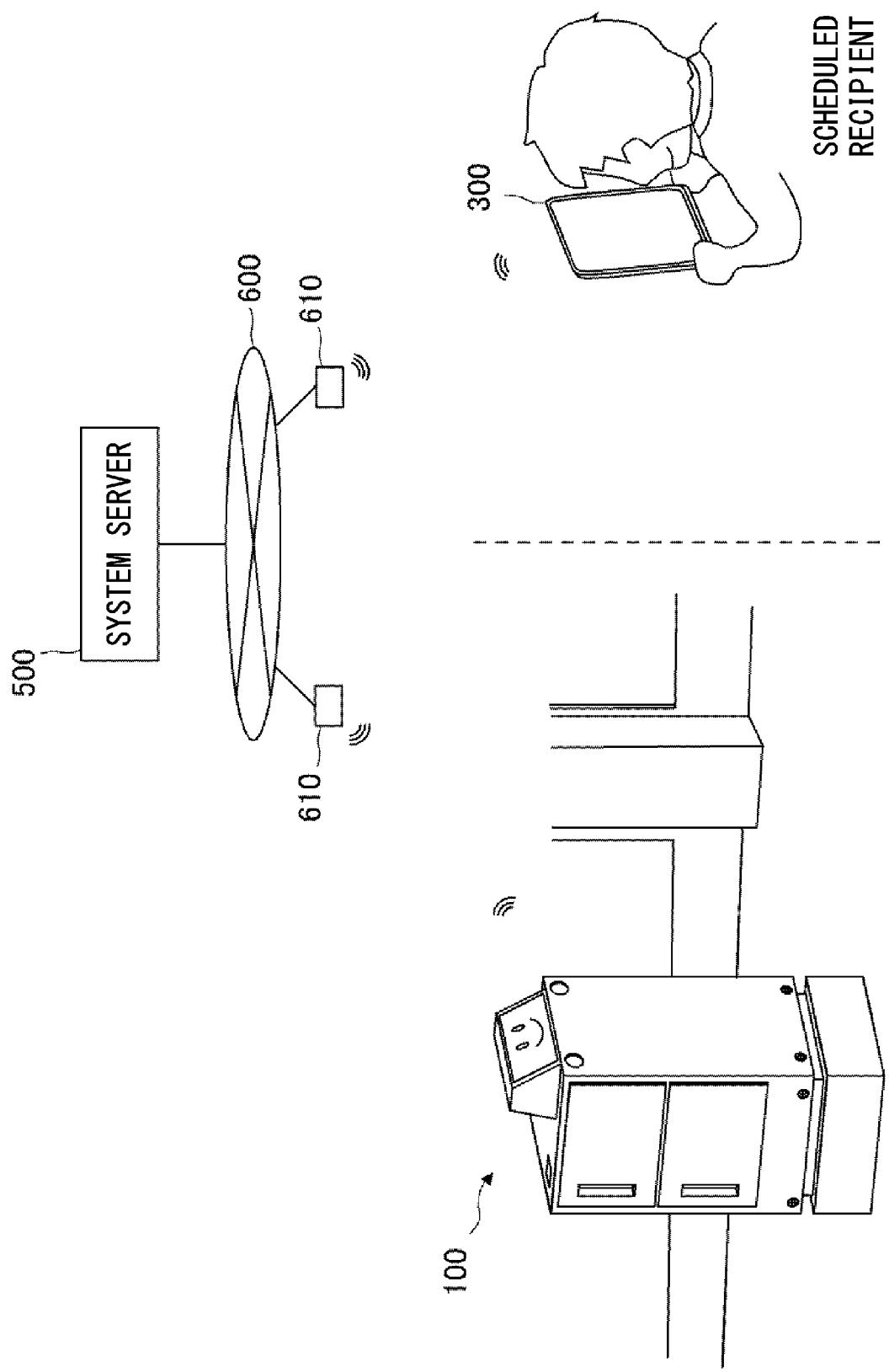
FIG. 1 is a conceptual diagram for explaining an overall configuration in which a conveyance robot according to an embodiment is used.

FIG. 1 is a conceptual diagram for explaining an overall configuration in which a conveyance robot 100 according to this embodiment is used. The conveyance robot 100 autonomously moves and conveys a conveyance object stored therein to a destination that has been set. When the conveyance robot 100 arrives at the set destination, a scheduled recipient of the conveyance object can collect the stored conveyance object.

The route along which the conveyance robot 100 moves is not necessarily a route exclusively for the robot, and in this embodiment, it is rather assumed that a movement route is set in an environment in which people come and go. Particularly in the case of moving in an environment in which people come and go, the conveyance robot 100 needs to cope with various changing circumstances until it reaches the destination. For example, avoiding a walking person is one of the operations which the conveyance robot 100 needs to perform under such circumstances. Further, depending on the changing circumstances, the conveyance robot 100 may not be able to reach the destination set when the conveyance object is sent. Therefore, if it is necessary to change the destination after the conveyance robot 100 starts conveying the conveyance object, the conveyance robot 100 determines a new destination and notifies a user terminal 300 of the scheduled recipient about information regarding the new destination. The user terminal 300 is an information terminal possessed by a user, and is, for example, a smartphone or a tablet terminal.

In this embodiment, the conveyance robot 100 and the user terminal 300 of the scheduled recipient are connected to each other via a system server 500 connected to a network 600. Various kinds of signals transmitted from the user terminal 300 of the scheduled recipient are once sent to the system server 500 via the network 600 and are transferred from the system server 500 to the target conveyance robot 100. Similarly, various kinds of signals transmitted from the conveyance robot 100 are once sent to the system server 500 via the network 600 and are transferred from the system server 500 to the target user terminal 300. The conveyance robot 100 and the user terminal 300 are connected to the network 600 by radio communication via communication units 610 which are, for example, wireless LAN units installed in the respective environments.

By the overall configuration described above, the elements for enabling the process for changing the destination after a start of conveyance are distributed to the conveyance robot 100, the user terminal 300, and the system server 500, whereby it is possible to construct the conveyance control system as a whole. Further, the elements for substantially enabling the process for changing the destination are assembled in one apparatus, whereby it is possible to construct the conveyance control system. Therefore, in this embodiment, a description is first given of a case in which the conveyance robot 100 includes the elements for substantially enabling the process for changing the destination. That is, a case where the conveyance control system is substantially implemented by the conveyance robot 100 is described.

Figure 2:
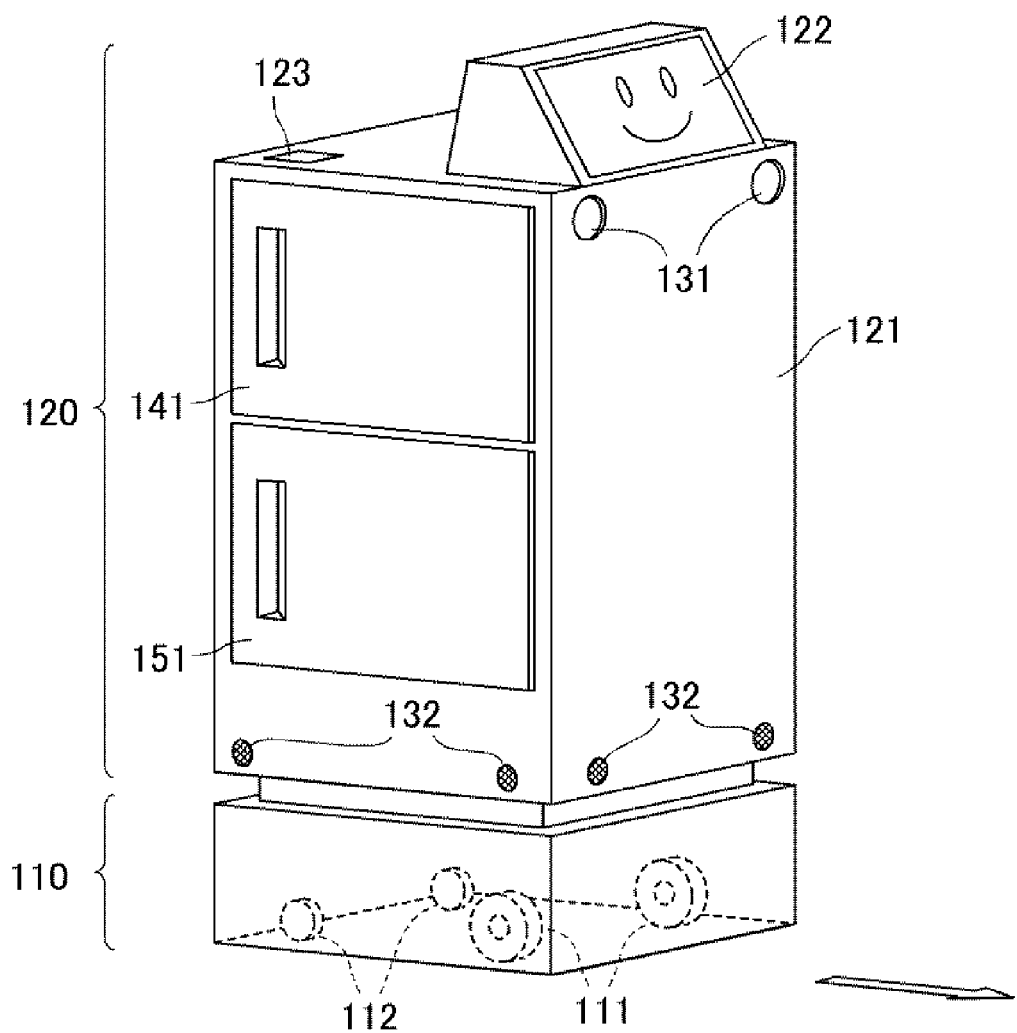
FIG. 2 is an external perspective view showing the conveyance robot according to the embodiment being in a locked state.

FIG. 2 is an external perspective view showing the conveyance robot 100 according to this embodiment being in a locked state. The conveyance robot 100 is an autonomous mobile body that can move autonomously. The conveyance robot 100 is mainly composed of a movable base part 110 and a main-body part 120.

The movable base part 110 supports two driving wheels 111 and two casters 112, each of which is in contact with the traveling surface, inside its rectangular shaped cover. The two driving wheels 111 are arranged so that the centers of their rotation axes coincide with each other. The two driving wheels 111 are arranged so that the centers of their rotation axes coincide with each other. Each of the caster 112 is a driven wheel and is disposed so that its pivotal axis extending from the movable base part 110 in the vertical direction axially supports the wheel at a place away from its rotation axis. Further, the casters 112 follow the movable base part 110 in accordance with the direction in which the movable base part 110 moves.

The conveyance robot 100 goes straight forward when, for example, the two driving wheels 111 are rotated at the same rotational speed in the same direction, and turns around the vertical axis that passes approximately the center of the two driving wheels 111 of the movable base part 110 when, for example, they are rotated at the same rotational speed in the opposite directions. That is, the conveyance robot 100 can move parallel to and rotate in any direction by controlling the rotational directions and the rotation speeds of each of the two driving wheels 111.

The main-body part 120 mainly includes a housing part 121 mounted on the upper part of the movable base part 110 and a display panel 122 installed on the upper surface of the housing part 121. The housing part 121 has a rectangular parallelepiped shape and includes therein racks for storing a conveyance object and a control box storing a control unit and the like which will be described later. The racks for storing a conveyance object are respectively housed in an upper-row storage part and a lower-row storage part that are partitioned from each other and are respectively closed by an upper-row door 141 and a lower-row door 151 at the time of conveyance. An electronic key for unlocking an electronic lock provided on each of the doors is stored in the user terminal 300, and the scheduled recipient can open these doors by bringing the user terminal 300 close to a terminal reading unit 123.

The display panel 122 is, for example, a liquid crystal display panel, and displays a face of a character and displays information about the conveyance robot 100 in the form of text or by using icons. By displaying the face of the character on the display panel 122, it is possible to impart an impression that the display panel 122 is a pseudo face part to people around the conveyance robot 100. Further, the display panel 122 includes a touch panel on the display surface and can receive an input instruction from a user.

A stereo camera 131 is installed in an upper part of the housing part 121 but is below the display surface of the display panel 122. The stereo camera 131 has a structure in which two camera units having the same angle of view are arranged so as to be away from each other, and outputs images captured by each of the camera units as image data. At the lower part of the housing part 121, ultrasonic sensors 132 directed toward the horizontal direction are provided on the respective surfaces of the housing part 121. The conveyance robot 100 analyzes image data output from the stereo camera 131 and detection signals output from the ultrasonic sensors 132, thereby recognizing surrounding obstacles and identifying (i.e., determining) the position of the conveyance robot 100. As shown in FIG. 2, the side of the conveyance robot 100 in which the stereo camera 131 is installed is the front thereof. That is, in a normal movement of the conveyance robot 100, the front direction of the conveyance robot 100 is the traveling direction thereof as indicated by an arrow.

Figure 3:
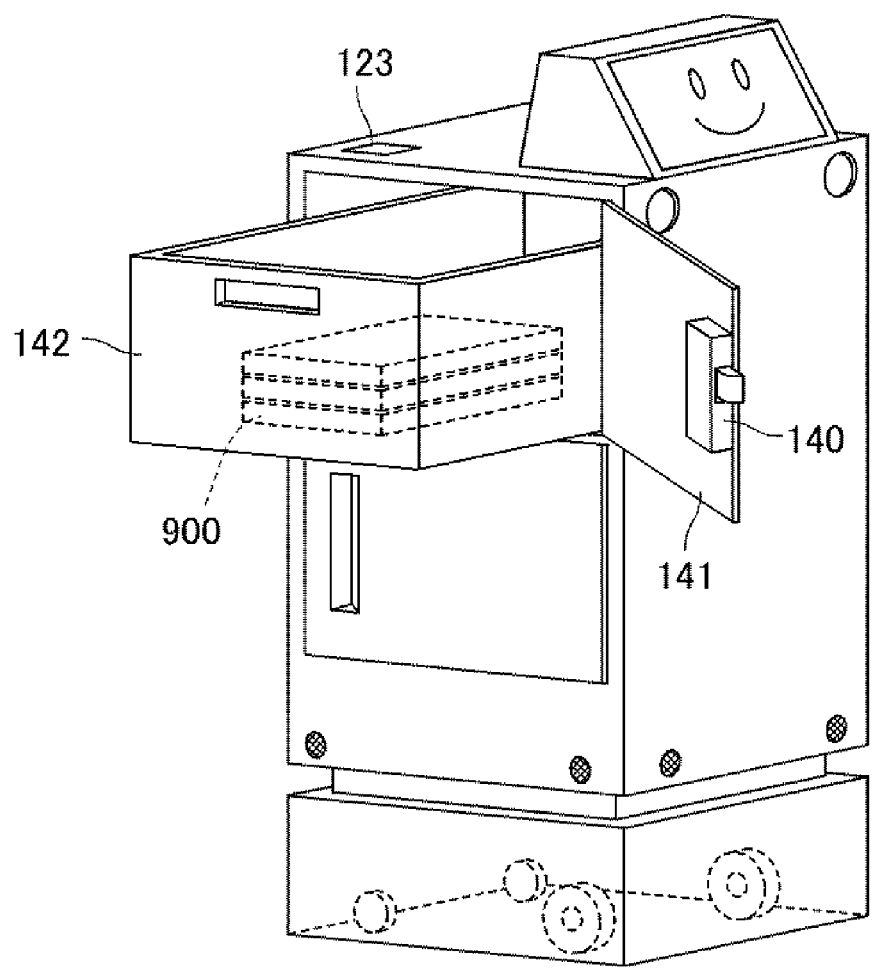
FIG. 3 is an external perspective view showing the conveyance robot according to the embodiment being in an unlocked state.

FIG. 3 is an external perspective view showing the conveyance robot 100 according to this embodiment being in an unlocked state. In particular, FIG. 3 shows a state in which an upper-row electronic lock 140 is unlocked, the upper-row door 141 is thus opened, and then an upper-row rack 142 housed in the upper-row storage part is pulled out. A conveyance object 900 is stored in the upper-row rack 142, and the scheduled recipient pulls out the upper-row rack 142 and collects the conveyance object 900 therefrom. The structure of the lower-row storage part is the same as that of the upper-row storage part.

Figure 4:
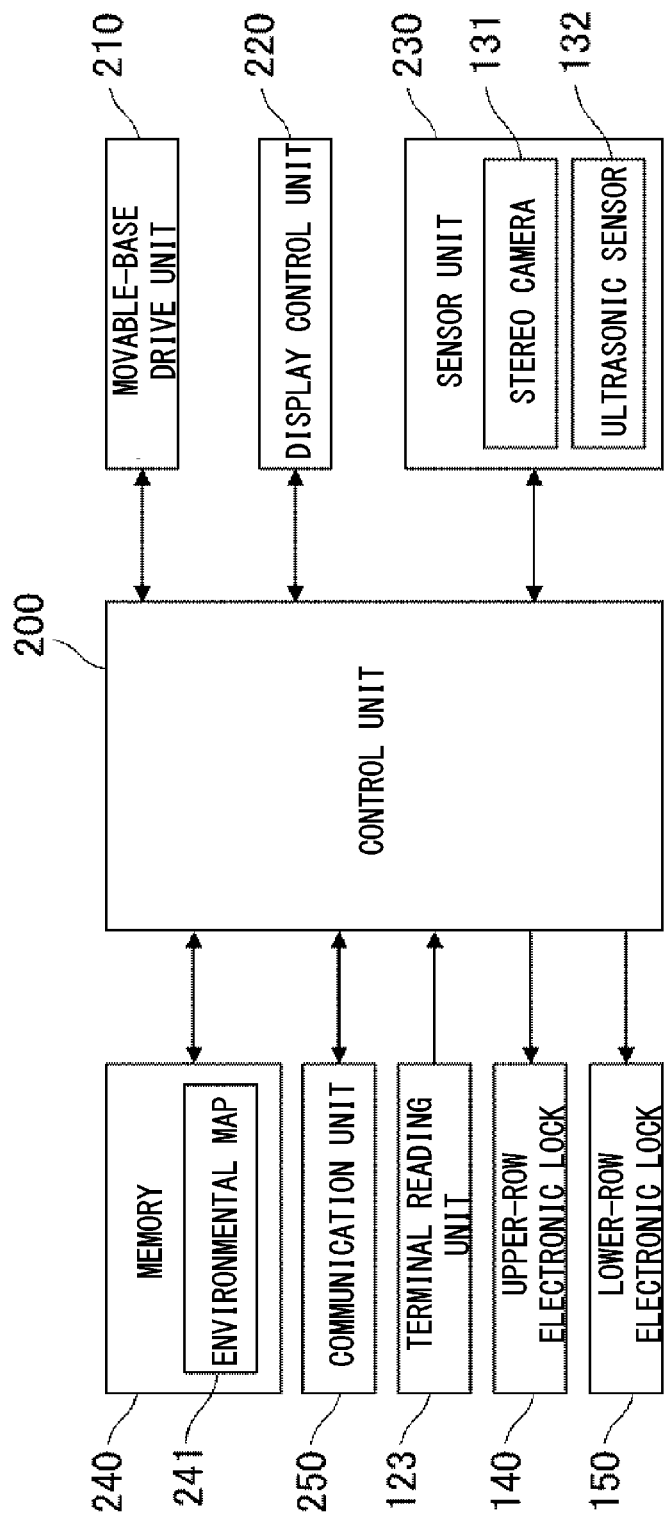
FIG. 4 is a control block diagram of the conveyance robot.

FIG. 4 is a control block diagram of the conveyance robot 100. A control unit 200 is, for example, a CPU, and executes a control program loaded from a memory 240, thereby controlling the entire apparatus. Particularly in this embodiment, the control unit 200 functions as a change unit that changes the destination after the conveyance robot 100 starts conveying the conveyance object, and functions as a notification unit that aggregates destination information about the changed destination and notifies the user terminal 300 of the scheduled recipient about this information. Specific examples of the processes performed by the change unit and the notification unit will be described later in detail.

A movable-base drive unit 210 includes a driving circuit and a motor for driving the driving wheels 111. A display control unit 220 generates a display video image in accordance with a control signal sent from the control unit 200 and displays the generated display video image on the display panel 122. Further, the display control unit 220 receives an operation on the touch panel superimposed on the display panel 122, generates an operation signal, and transmits the generated operation signal to the control unit 200.

A sensor unit 230 includes various sensors that detect people and objects present around the conveyance robot 100 and that monitor conveyance objects. The stereo camera 131 and the ultrasonic sensor 132 are components of the sensor unit 230. The control unit 200 drives the various sensors by transmitting a control signal to the sensor unit 230 and then acquires signals and data output from the sensors.

The memory 240 is a nonvolatile storage medium. For example, a solid-state drive is used for the memory 240. The memory 240 stores, in addition to a control program for controlling the conveyance robot 100, various parameter values, functions, lookup tables, and the like used for the control. In particular, the memory 240 stores an environmental map 241 which describes map information of an environment in which the conveyance robot 100 autonomously moves.

A communication unit 250 is, for example, a wireless LAN unit. The control unit 200 transmits and receives various kinds of information to and from the system server 500 connected to the network 600 via the communication unit 250. When the control unit 200 functions as the notification unit, the communication unit 250 plays a role in transmitting destination information to the user terminal 300.

The terminal reading unit 123 is a reading apparatus for near field communication for reading information from the user terminal 300 when the user terminal 300 is brought close to the terminal reading unit 123. The user terminal 300 includes, for example, a FeliCa (registered trademark) chip mounted thereon, and passes information of the stored electronic key to the control unit 200 via the terminal reading unit 123. The control unit 200 unlocks the upper-row electronic lock 140 when the information of the electronic key acquired from the user terminal 300 coincides with the unlocking information of the upper-row electronic lock 140, and unlocks a lower-row electronic lock 150 when the information of the electronic key acquired from the user terminal 300 coincides with the unlocking information of the lower-row electronic lock 150.

At the starting point, a shipping worker conducts work of packing the conveyance object into the storage part of the housing part 121, and conducts work of inputting information about the scheduled recipient, the contents of the conveyance object, and the like to the conveyance robot 100 through the touch panel of the display panel 122 or the like. The control unit 200 of the conveyance robot 100 transmits the input information of the conveyance object and the information of the destination that is the place where the conveyance object is to be received to the user terminal 300 of the specified scheduled recipient via the system server 500. The scheduled recipient of the user terminal 300 which has received such information pieces confirms the destination of the conveyance robot 100, and goes to the destination to collect the conveyance object from the conveyance robot 100 that has arrived at the destination.

However, as described above, the conveyance robot 100 may not be able to reach a set destination depending on circumstances in the environment around the conveyance robot 100 during its movement. In such a case, if the conveyance robot 100 changes the destination, the scheduled recipient cannot collect the conveyance object even when he/she goes to the original destination. For example, it is conceivable the destination may be changed as follows.

Figure 5:
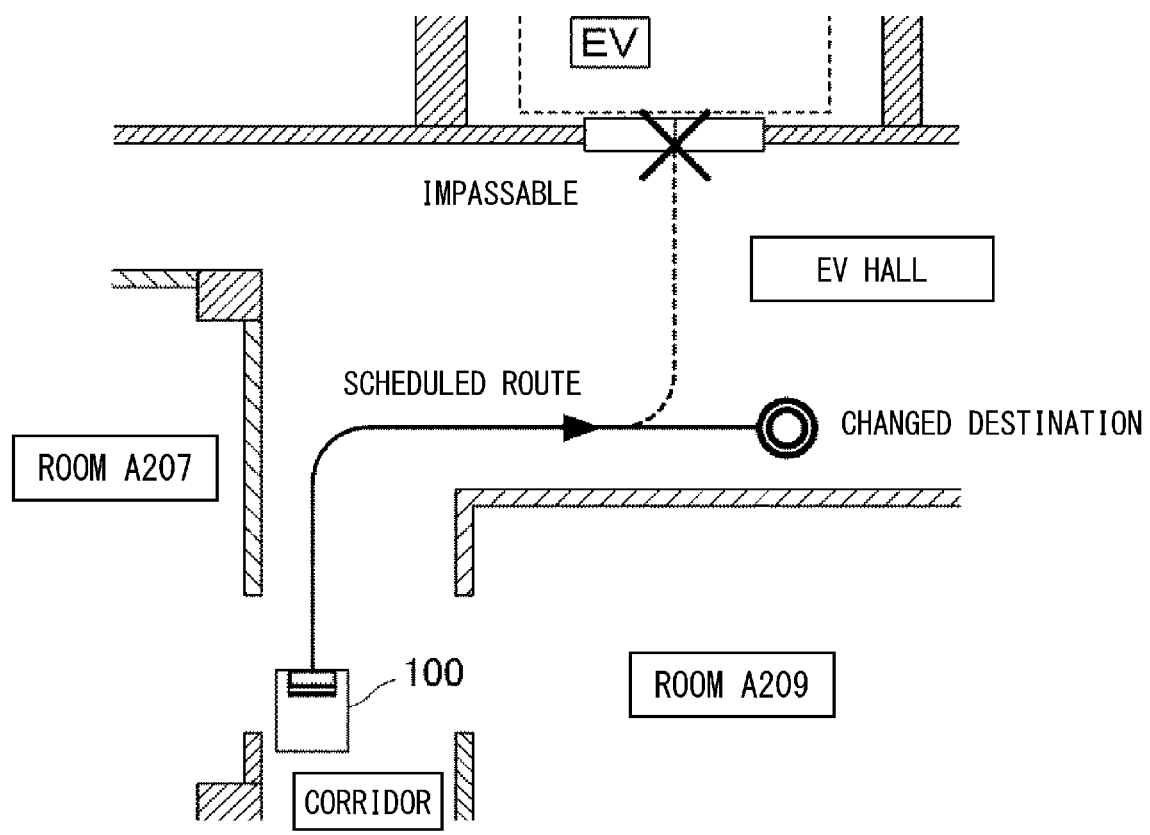
FIG. 5 is a map showing an example of a situation in which a destination is changed.

FIG. 5 is a map showing an example of a situation in which a destination is changed by the conveyance robot 100. Specifically, FIG. 5 is a schematic view of a part of a floor where the conveyance robot 100 moves when viewed from above, and shows a state in which the conveyance robot 100 is moving in a corridor between rooms (a room A207 and a room A209). In this case, it is assumed that the conveyance robot 100 is moving along a route in which the conveyance robot 100 uses an elevator (EV) to move to another floor, which is the original destination.

When the control unit 200 communicates with an elevator system while the conveyance robot 100 moves along the scheduled route and the control unit 200 finds that the cage of the elevator cannot be called for any reason, the control unit 200 executes processes for changing the destination. In the case shown in FIG. 5, as the entrance of the cage of the elevator is a point through which the conveyance robot 100 cannot pass, the control unit 200 refers to the environmental map 241 and searches for destination candidates that meet a predetermined criterion around this point. Examples of the criterion for the candidate destination include that it is a space larger than a certain size and that it is a place that is not hidden behind an obstacle. The control unit 200 can search for the above candidates using the output from the sensor unit 230. Further, when the point as described above is registered in advance in the environmental map 241, the information of the environmental map 241 can also be used.

In the example shown in FIG. 5, the destination is changed to a certain place near an elevator hall (an EV Hall) which is a relatively large space. When the control unit 200, as the change unit, changes the destination, the control unit 200, as the notification unit, aggregates destination information and transmits it to the user terminal 300 of the scheduled recipient. After that, the control unit 200 controls the movable-base drive unit 210 to move the conveyance robot 100 toward the changed destination. The above processes executed by the conveyance robot 100 are described below with reference to a user interface screen displayed by the user terminal 300 of the scheduled recipient.

Figure 6:
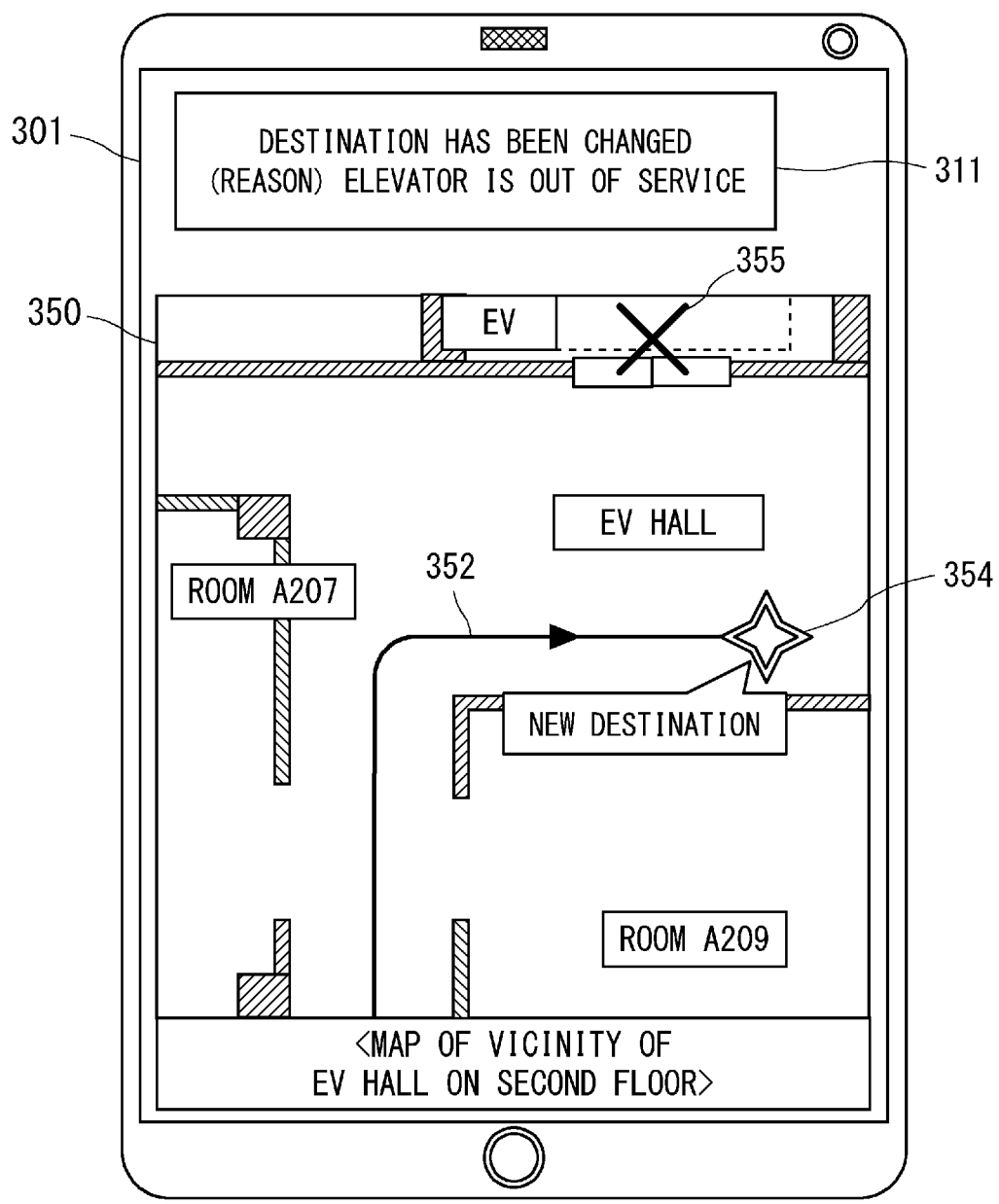
FIG. 6 is an example of a user interface screen for notifying a change of a destination.

FIG. 6 is an example of the user interface screen that is displayed on the display panel 301 of the user terminal 300 and informs a user of a change of a destination. The report window 311 displays information which the conveyance robot 100 has sent a notification about, and in FIG. 6, it displays the information that the destination has been changed ("destination has been changed") and a reason for the change ("reason: the elevator is out of service") in text form. That is, when the notification unit itself changes the destination in accordance with the circumstances in the environment around the conveyance robot 100, the notification unit notifies the user terminal 300 about the reason for the change together with information about the changed destination.

A map window 350 displays the information about the changed destination. Specifically, the map window 350 displays the changed destination by a destination icon 354 superimposed on a map of the vicinity of the changed destination, and displays the route of the conveyance robot 100 to the changed destination as a scheduled route line 352. Further, the map window 350 displays, as the accompanying information, text information ("MAP of the vicinity of the EV Hall on the second floor") indicating the place shown by the vicinity map, an impassable icon 355 indicating a place that cannot be passed through due to the reason for that the destination has been changed, and the like. The vicinity map is zoomed in or out in accordance with, for example, a pinch operation of the scheduled recipient, and slides in accordance with a drag operation of the scheduled recipient. The scheduled recipient can recognize the changed destination through the user interface screen described above. That is, the scheduled recipient can reliably receive the conveyance object even when the destination of the conveyance robot is changed.

Figure 12:
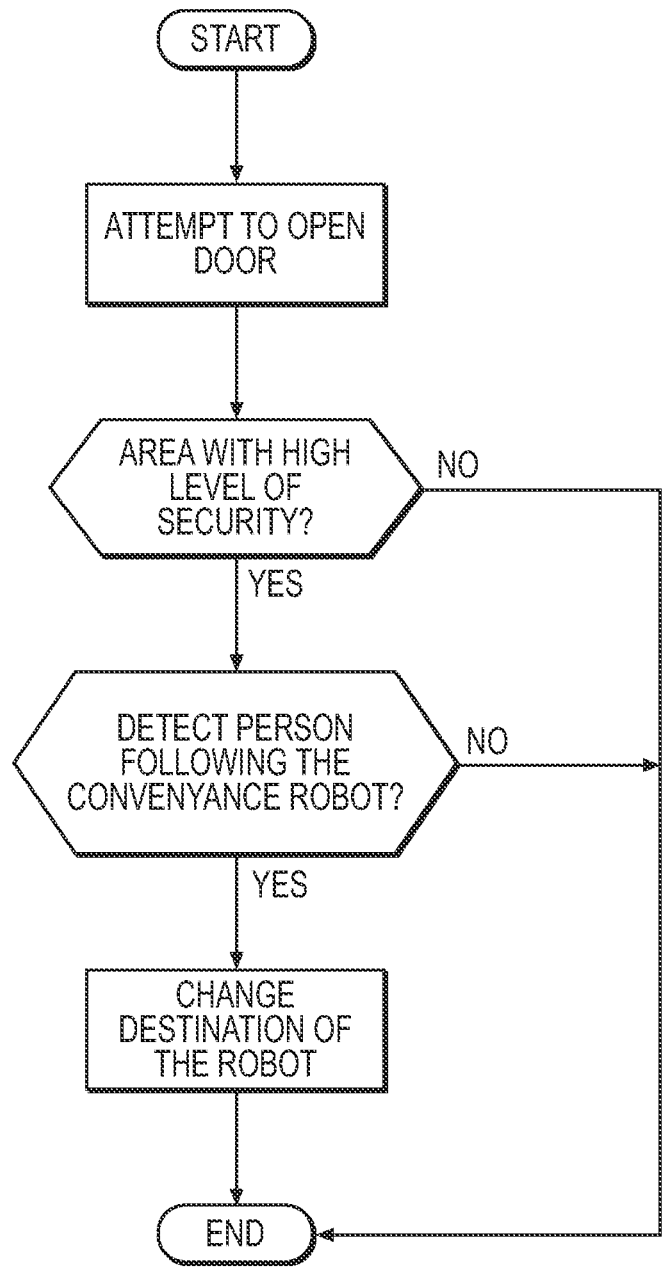
FIG. 12 is a flowchart regarding a process for changing a destination performed by the conveyance robot.

Note that the reasons why the conveyance robot 100 cannot reach the original destination are not limited to the reason that the elevator is out of service, but may also be a reason that an automatic door which should have been opened is not opened, or a reason that there was a heavy traffic of people and a route for avoiding this traffic has not been successfully generated within a predetermined period of time. Further, as shown in FIG. 12, in a case in which the conveyance robot 100 attempts to open the door of an area with a high level of security and enter there, the conveyance robot 100 gives up entering the area when it detects a person following the conveyance robot 100. This case may also become a reason why the conveyance robot 100 cannot reach the original destination. Further, the reasons why the conveyance robot 100 cannot reach the original destination are not limited to the reasons due to the environment of the movement route, but may instead be reasons directly due to the conveyance robot 100, such as a dead battery and a sensor failure of the conveyance robot 100.

The conditions under which the change unit of the conveyance robot 100 changes the destination after the start of conveyance is not limited to the fact that the conveyance robot 100 cannot reach the original destination, but can instead be set in various ways. For example, if the scheduled recipient has moved far away from the vicinity of the original destination, the change unit may change the destination of the conveyance robot 100 to the vicinity of the place to which the scheduled recipient has moved.

The system server 500 continuously recognizes the position of the user terminal 300 of the scheduled recipient by communicating with this user terminal 300. The control unit 200 of the conveyance robot 100 recognizes the movement of the scheduled recipient by periodically acquiring position information about the scheduled recipient via the communication unit 250. At this time, the control unit 200 functions as an acquisition unit that acquires location information about the location of the scheduled recipient in cooperation with the communication unit 250. Then, the change unit determines whether the scheduled recipient is present within a predetermined range (e.g., 50 m) from the original destination. When the change unit determines that the scheduled recipient is not present within such a range, it changes the destination of the conveyance robot 100 to the vicinity of the place to which the scheduled recipient has moved. Specifically, the change unit refers to the environmental map 241 and determines a new destination from among the destination candidates that meet a predetermined criterion in the vicinity of the place to which the scheduled recipient has moved.

Figure 7:
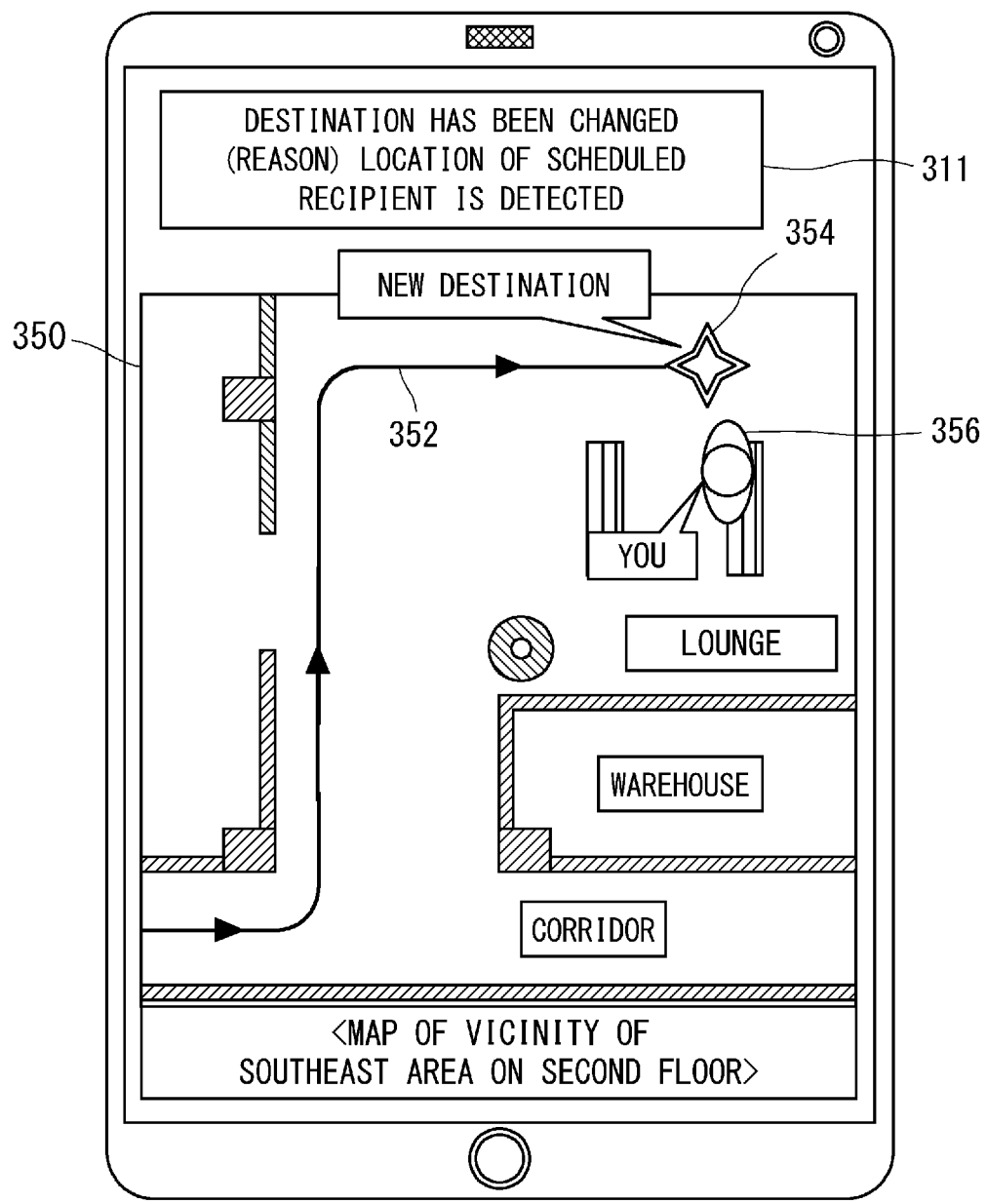
FIG. 7 is an example of the user interface screen for notifying the change of a destination.

FIG. 7 is an example of the user interface screen for notifying about a new destination changed from the original one as described above. The report window 311 displays the information that the destination has been changed ("destination has been changed") and a reason for the change ("reason: the location of the scheduled recipient is detected") in text form. That is, the report window 311 transmits a notification that the destination of the conveyance robot 100 has been changed because it is detected that the scheduled recipient is far away from the original destination.

As in the case of FIG. 6, the map window 350 displays the scheduled route line 352, the destination icon 354, and the accompanying information that are superimposed on the vicinity map. Further, a recipient icon 356 indicating the detected location of the scheduled recipient is also superimposed on the vicinity map. The scheduled recipient can recognize that the conveyance robot 100 will convey the conveyance object to the vicinity of the place to which he/she has moved through the user interface screen described above. The above-described change of the destination performed by the conveyance robot 100 eliminates the need for the scheduled recipient to stay near the original destination until the conveyance robot 100 arrives.

Figure 8:
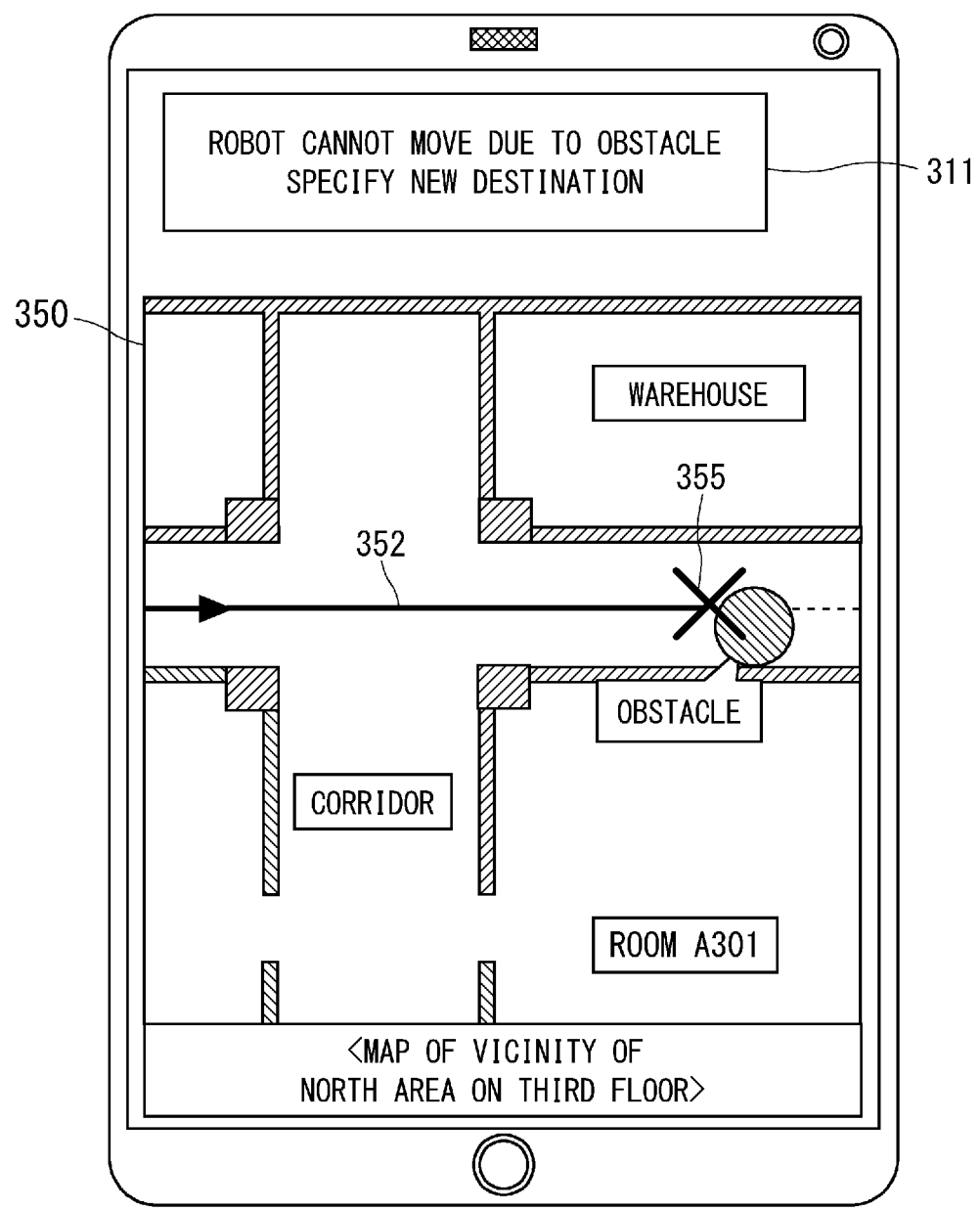
FIG. 8 is an example of the user interface screen for requesting a change of a destination.

In some cases, the change unit of the conveyance robot 100 cannot set a new destination even if the destination needs to be changed. FIG. 8 shows an example of the user interface screen for requesting the scheduled recipient to change the destination in such a case. The report window 311 displays a reason to change the destination ("the robot cannot move due to obstacles") and a request for specification of a new destination ("specify a new destination") in text form.

As in the case of FIG. 6, the map window 350 displays the scheduled route line 352, the impassable icon 355, and the accompanying information that are superimposed on the vicinity map. The impassable icon 355 is superimposed in the vicinity of a detected obstacle. The scheduled recipient confirms the status of the conveyance robot 100 through the user interface screen described above. Then, the scheduled recipient, for example, slides the vicinity map by dragging it to find a place where the conveyance robot 100 can stay for a while, and specifies a new destination by a tap operation. The change unit of the conveyance robot 100 determines the destination specified by the scheduled recipient to be a changed destination. Note that when a change of the destination is performed according to the instruction from the scheduled recipient as described above, the notification unit does not need to again notify the user terminal 300 about destination information as the scheduled recipient already knows the new destination. In other words, the notification unit notifies the user terminal 300 about destination information when the change unit changes the destination without an instruction from the scheduled recipient.

Note that if the change unit of the conveyance robot 100 cannot set a new destination by itself, and thus the change unit requests a person to change the destination, the person whom the change unit requests to change the destination may not be the scheduled recipient but instead a shipping worker. In this case, an instruction to change a destination is received from the shipping worker by displaying the contents corresponding to the display in FIG. 8 on the user terminal possessed by him/her. When a destination is thus changed by the shipping worker, the notification unit notifies the user terminal 300 of the scheduled recipient about information regarding the changed destination.

As the conveyance robot 100 moves in an environment in which people come and go, it sometimes becomes an obstacle to the people coming and going, and may be forcibly removed. For example, when the conveyance robot 100 operates in a hospital and an emergency patient is taken therein by a stretcher, the conveyance robot 100 may be pushed by a nurse or the like and thus removed from the route of the stretcher. Then, if the conveyance robot 100 continues to move even though the conveyance robot 100 has been forcibly removed by an external force, the conveyance robot 100 becomes an obstacle to the people coming and going. Therefore, when the conveyance robot 100 has been removed to a place by an external force, the change unit determines the place to which the conveyance robot 100 has been removed to be a changed destination and thus the conveyance robot stays there.

Figure 9:
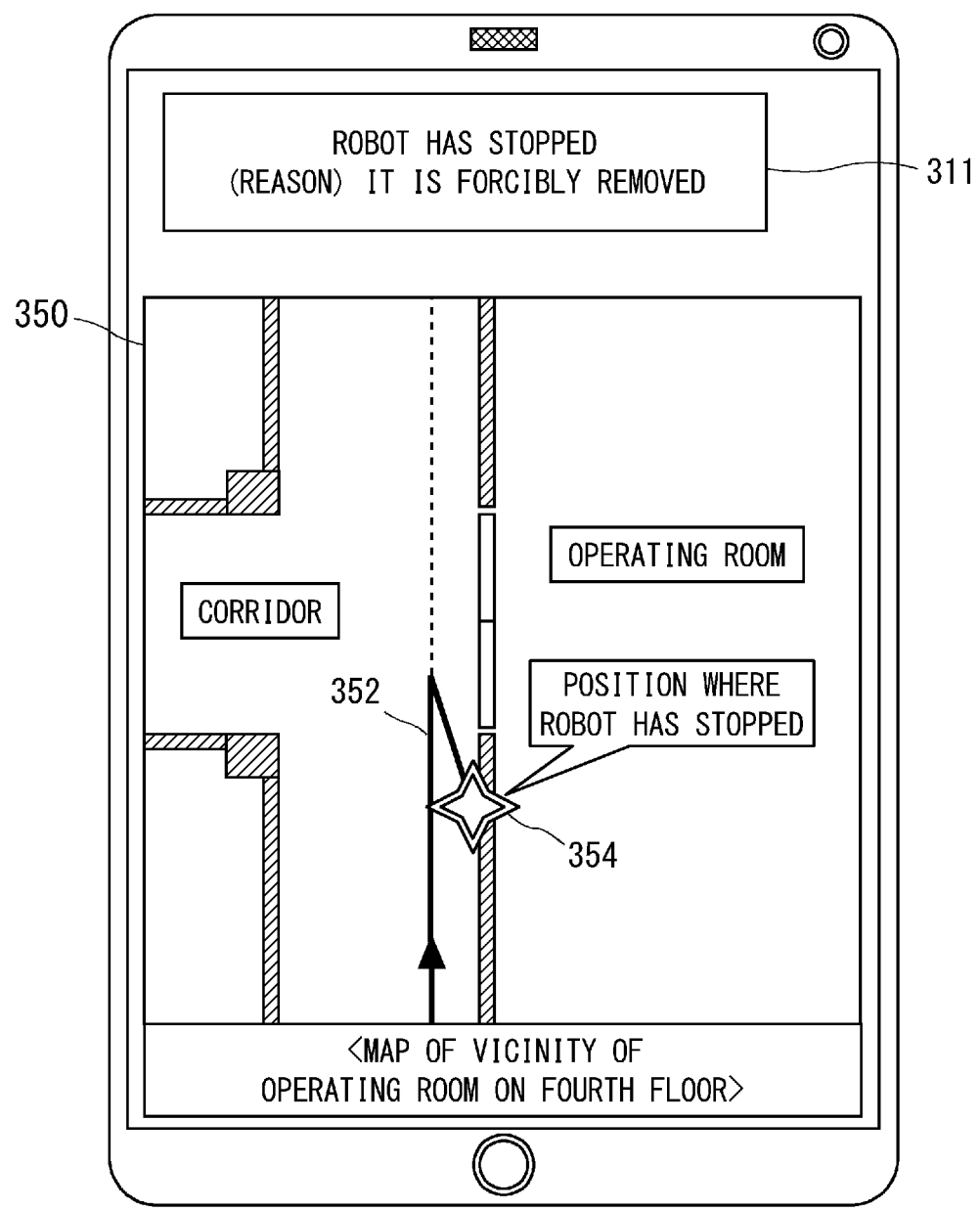
FIG. 9 is an example of the user interface screen for notifying that the conveyance robot has stopped.

FIG. 9 shows an example of the user interface screen for notifying that the conveyance robot 100 has stopped in the above case. The report window 311 displays the information that the conveyance robot 100 has stopped ("the robot has stopped") and a reason for the stoppage ("reason: the robot has been forcibly removed") in text form.

As in the case of FIG. 6, the map window 350 displays the scheduled route line 352 (in this case, the route that the conveyance robot 100 has already passed through), the destination icon 354 (in this case, it indicates the position where the conveyance robot 100 has stopped), and the accompanying information that are superimposed on the vicinity map. The scheduled recipient can recognize where the conveyance robot 100 has stopped through the user interface screen described above. The scheduled recipient goes to the position where the conveyance robot 100 has stopped and collects the conveyance object. Note that when the control unit 200 detects that the conveyance robot is pushed by an external force, the notification unit may notify the user terminal 300 about the fact that the conveyance robot 100 has been pushed and information about the place where the conveyance robot 100 has been pushed.

Figure 10:
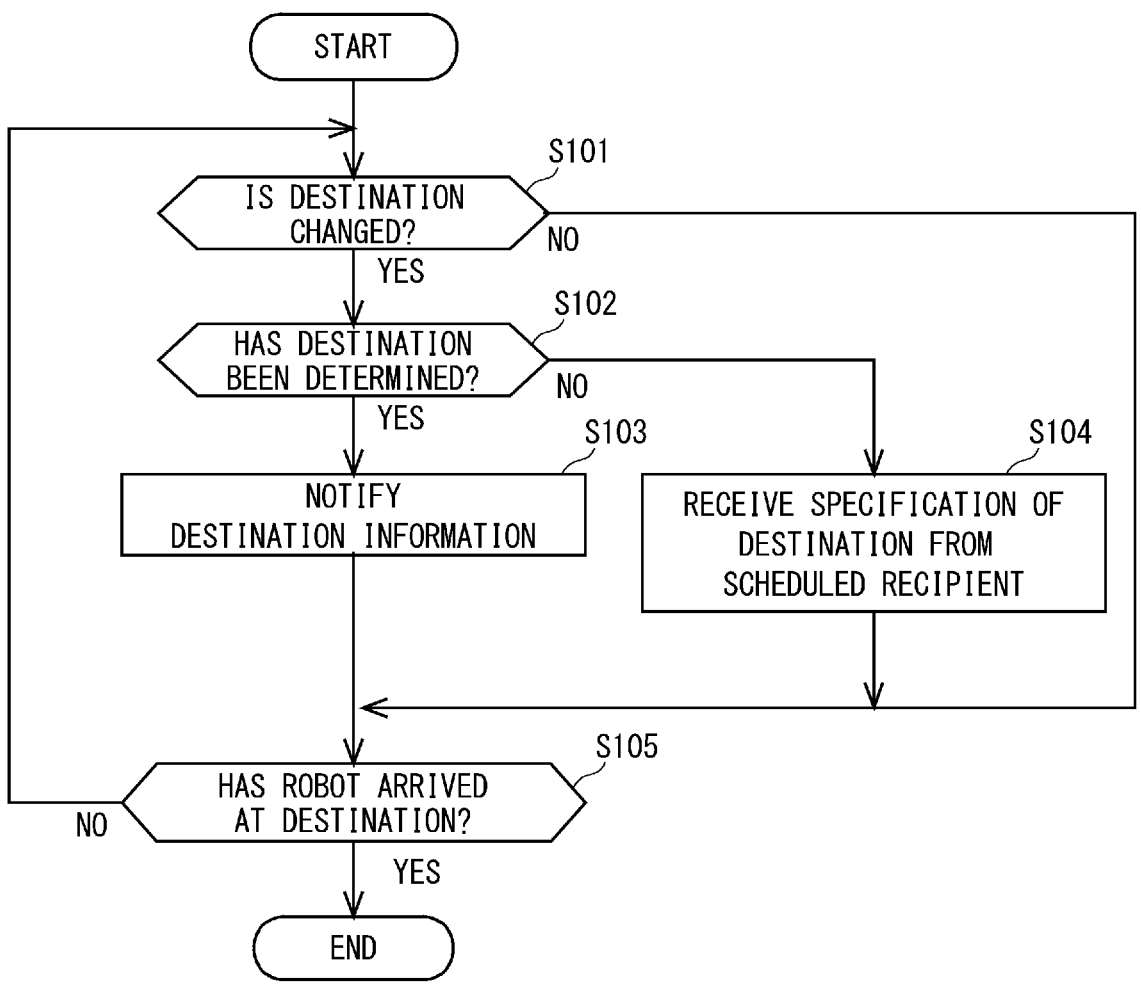
FIG. 10 is a flowchart regarding processes for changing a destination performed by the conveyance robot.

Next, conveyance processes performed by the conveyance robot 100 will be described, with a focus on processes related to a change of a destination. FIG. 10 is a flowchart regarding the processes for changing the destination performed by the conveyance robot. The process flow shown in FIG. 10 is merely a typical example of the processes for changing the destination, and does not cover all the aforementioned exemplary aspects. The process flow shown in FIG. 10 starts from the point in time when a shipping worker has packed the conveyance object into the storage part and input information about the scheduled recipient, the content of the conveyance object, the conveyance destination, and the like, and then the conveyance robot 100 has started moving toward the destination.

In Step S101, the control unit 200 determines whether a situation in which a destination is changed has occurred. Specifically, if the cage of the elevator cannot be called, or an obstacle that cannot be avoided is detected on the scheduled route, the control unit 200 determines that a situation in which a destination is changed has occurred. If the control unit 200 determines that such a situation has not occurred, the process proceeds to Step S105, while if the control unit 200 determines that such a situation has occurred, the process proceeds to Step S102.

In Step S102, the change unit searches for a new destination. If a new destination is determined as a result of the search, the process proceeds to Step S103, while if it is not determined, the process proceeds to Step S104. If the process proceeds to Step S103, the notification unit aggregates the destination information about the changed destination and a reason for the change into communication data, and transmits it to the user terminal 300 of the scheduled recipient. Note that the destination information includes map information about the vicinity of the changed destination extracted from the environmental map 241. Then, the control unit 200 causes the conveyance robot 100 to move toward the changed destination.

If the process proceeds to Step S104, the notification unit aggregates the map information about the vicinity of the place through which the conveyance robot 100 cannot pass, which is extracted from the environment map 241, into communication data, and transmits it to the user terminal 300 of the scheduled recipient. Then, the control unit 200 receives information about the new destination indicated by the scheduled recipient from the user terminal 300 of the scheduled recipient. Then, the control unit 200 causes the conveyance robot 100 to move toward the changed destination.

When the process proceeds from Step S101, Step S103, or Step S104 to Step S105, the control unit 200 determines whether the conveyance robot 100 has arrived at the destination. If the control unit 200 determines that the conveyance robot 100 has not yet arrived, the process returns to Step S101. If the control unit 200 determines that the conveyance robot 100 has already arrived, the control unit 200 causes the conveyance robot 100 to stop moving and ends the series of processes. After that, processes such as collection of the conveyance object are performed.

Figure 11:
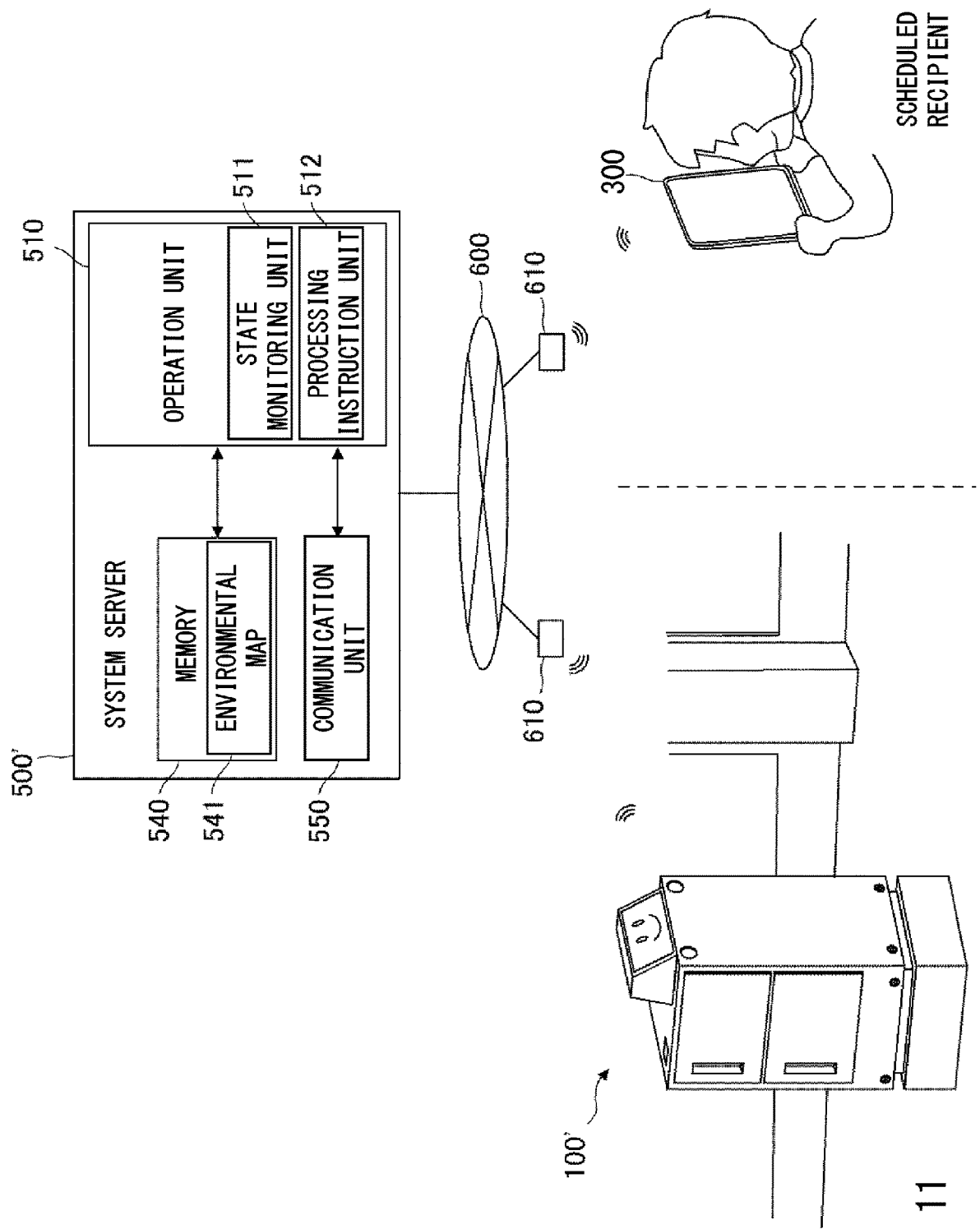
FIG. 11 is a diagram for explaining another embodiment.

The conveyance robot 100 described above executes most of the processes related to a change of the destination by itself. However, another embodiment in which the conveyance robot executes only simple processes in response to a command sent from the system server in order to reduce the processes performed by the conveyance robot may be adopted. FIG. 11 is a diagram for explaining a conveyance control system according to the above embodiment. The conveyance control system includes a system server 500' and a conveyance robot 100' connected to the system server 500' via the network 600 and the communication unit 610.

The system server 500' includes an operation unit 510, a memory 540, and a communication unit 550. The operation unit 510 is, for example, a CPU, and executes a control program loaded from the memory 540, thereby controlling the entire system.

The memory 540, which is a nonvolatile storage medium, may be, for example, a hard disc drive. The memory 540 stores, in addition to the control program for controlling the conveyance control system, various parameter values, functions, lookup tables, and the like used for the control. In particular, the memory 540 stores an environmental map 541 which describes map information of an environment in which the conveyance robot 100' autonomously moves. The environmental map 541 is similar to the environmental map 241 described above. The communication unit 550 is a communication device to be connected to the network 600. The operation unit 510 transmits and receives various kinds of instruction signals and information to and from the conveyance robot 100' and the user terminal 300 via the communication unit 550, the network 600, and the communication unit 610.

The operation unit 510, which functions as a function operation unit, also functions as a state monitoring unit 511 and a processing instruction unit 512. The state monitoring unit 511 recognizes the position of the conveyance robot 100', the state of the moving route thereof, the storage parts thereof being in a locked state, and the like from the information sent from the conveyance robot 100' and monitors them. The processing instruction unit 512 instructs the conveyance robot 100' to execute a process to be executed by the conveyance robot 100'. Specifically, the processing instruction unit 512 generates a control signal for causing the conveyance robot 100' to execute the process and transmits the generated control signal to the conveyance robot 100' via the communication unit 550.

By the conveyance robot 100' of the conveyance control system configured as described above, the processes for changing the destination similar to those executed by the conveyance robot 100 can also be executed. Specifically, the state monitoring unit 511 determines whether it is necessary to change the destination based on a state of movement of the conveyance robot 100'. Then, if the state monitoring unit 511 determines that it is necessary to change the destination, the state monitoring unit 511, as the change unit, searches for a new destination to change the destination to. The processing instruction unit 512 causes the conveyance robot 100' to move to the changed destination. Further, the processing instruction unit 512, as the notification unit, notifies the user terminal 300 about destination information regarding the new destination which the change unit has changed the destination to.

In the conveyance control system thus constructed, the conveyance robot 100' may also operate in a way similar to the way the above-described conveyance robot 100 operates. In this system, the conveyance robot 100' can be easily constructed as it is sufficient for it to execute operation processing of which the processing load is relatively light.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance control system configured to control a conveyance robot to autonomously move and convey a conveyance object to a destination, the conveyance control system comprising:
  at least one memory storing computer-executable instructions; and
  at least one processor configured to access the at least one memory and execute the computer-executable instructions to:
    transmit, via a network, to an information terminal of a scheduled recipient of the conveyance object, first information indicating the destination where the conveyance object is to be received by the scheduled recipient so that the scheduled recipient is able to receive the conveyance object at the destination, when the conveyance robot attempts to open a door of a security area to enter the security area and the conveyance robot detects a person following the conveyance robot, change the destination after the conveyance robot starts conveying the conveyance object such that the conveyance robot does not enter the security area; and when the destination of the conveyance robot is changed, transmit, via the network, to the information terminal of the scheduled recipient of the conveyance object, second information indicating the changed destination so that the scheduled recipient is able to receive the conveyance object at the changed destination.

2. The conveyance control system according to claim 1, wherein the at least one processor transmits the second information when the at least one processor changes the destination without an instruction from the scheduled recipient.

3. The conveyance control system according to claim 1, wherein the at least one processor is further configured to acquire, via the network, location information about a location of the scheduled recipient, wherein the at least one processor changes the destination based on the location information so that the scheduled recipient is able to receive the conveyance object at the location of the scheduled recipient.

4. The conveyance control system according to claim 1, wherein when no destination that meets a predetermined criterion is found, the at least one processor changes the destination based on an instruction from a sender or the scheduled recipient of the conveyance object.

5. The conveyance control system according to claim 1, wherein when the conveyance robot has been removed to a place by an external force, the at least one processor determines the place to which the conveyance robot has been removed to be the changed destination.

6. The conveyance control system according to claim 1, wherein the second information further indicates a reason why the destination has changed.

7. The conveyance control system according to claim 1, wherein when the conveyance robot reaches the changed destination and the conveyance object is collected, the at least one processor is configured to transmit, via the network, to the information terminal of a sender of the conveyance object, third information indicating a collector.

8. A non-transitory computer readable medium storing a conveyance control program for controlling a conveyance robot to autonomously move and convey a conveyance object to a destination, the conveyance control program, when executed, causes a computer to:

transmit, via a network, to an information terminal of a scheduled recipient of the conveyance object, first information indicating the destination where the conveyance object is to be received by the scheduled recipient so that the scheduled recipient is able to receive the conveyance object at the destination, when the conveyance robot attempts to open a door of a security area to enter the security area and the conveyance robot detects a person following the conveyance robot, change the destination after the conveyance robot starts conveying the conveyance object such that the conveyance robot does not enter the security area; and when the destination of the conveyance robot is changed, transmit, via the network, to the information terminal of the scheduled recipient of the conveyance object, second information indicating the changed destination so that the scheduled recipient is able to receive the conveyance object at the changed destination.

9. A conveyance control method for controlling a conveyance robot to autonomously move and convey a conveyance object to a destination, the conveyance control method comprising:

transmitting, via a network, to an information terminal of a scheduled recipient of the conveyance object, first information indicating the destination where the conveyance object is to be received by the scheduled recipient so that the scheduled recipient is able to receive the conveyance object at the destination, when the conveyance robot attempts to open a door of a security area to enter the security area and the conveyance robot detects a person following the conveyance robot, changing the destination after the conveyance robot starts conveying the conveyance object such that the conveyance robot does not enter the security area; and when the destination of the conveyance robot is changed, transmitting, via the network, to the information terminal of the scheduled recipient of the conveyance object, second information indicating the changed destination so that the scheduled recipient is able to receive the conveyance object at the changed destination.

10. The conveyance control system according to claim 5, wherein:

in response to the conveyance robot being removed to the place by the external force, the at least one processor is configured to cause the conveyance robot to stay at the place and the at least one processor is configured to transmit, to the information terminal, a reason for the stoppage which is displayed, on a display, as a message including the reason for the stoppage.

* * * * *